US005688440A

United States Patent [19]
Garner

[11] Patent Number: 5,688,440
[45] Date of Patent: Nov. 18, 1997

[54] ORGANIC GELLATION AGENTS

[75] Inventor: Charles M. Garner, McGregor, Tex.

[73] Assignee: Baylor University, Waco, Tex.

[21] Appl. No.: 548,542

[22] Filed: Oct. 26, 1995

[51] Int. Cl.$^6$ .................. B01J 13/00; C10L 7/02
[52] U.S. Cl. ............ 252/315.1; 44/266; 44/268; 210/925; 510/201; 510/403; 568/808; 588/252; 588/901; 422/42
[58] Field of Search ............ 252/315.1; 44/266, 44/268; 422/42; 588/252, 901; 568/661, 808

[56] References Cited

U.S. PATENT DOCUMENTS

| T901,017 | 8/1972 | Hamb et al. ............ 568/808 X |
| 2,388,887 | 11/1945 | Weissberger et al. ........ 252/315.1 |
| 3,183,068 | 5/1965 | Monick ............ 44/266 |
| 4,391,827 | 7/1983 | Harbert et al. ............ 514/383 |
| 4,479,825 | 10/1984 | Fernandez ............ 106/34 |
| 4,894,487 | 1/1990 | Miura et al. ............ 568/832 |
| 4,986,936 | 1/1991 | Wolbers ............ 252/170 |
| 5,420,366 | 5/1995 | Zhao ............ 568/832 |

FOREIGN PATENT DOCUMENTS

| 53-124595 | 10/1978 | Japan . |
| 3-281684 | 12/1991 | Japan . |
| 4-352787 | 12/1992 | Japan . |
| 4-368389 | 12/1992 | Japan . |
| 5-320617 | 10/1993 | Japan . |

OTHER PUBLICATIONS

Meakins, G. D. et al. "The Preparation and Conformations of 1–Alkyl–and 1–Aryl–4–t–butyl–cyclohexanols", *J. Chem Soc.*(C), 1968, 1106–1109.

Mukkamala and Weiss,"Physical Gelation of Organic Fluids by Athraquinone–Steroid–Based Molecules. Structural Features Influencing the Properties of Gels,"*Langmuir*, 12:1474–1482, 1996.

*Primary Examiner*—Richard D. Lovering
*Attorney, Agent, or Firm*—Arnold, White & Durkee

[57] ABSTRACT

The present invention generally relates to the formation of organic gels by dissolving organic gelling agents in organic solvents. The aryl cyclohexanol gelling agents employed in this invention are not structurally related to previously known gellation agents and they exhibit potent gellation activity, for example, from 0.2–5%, by weight, of gelling agent is able to immobilize a variety of organic solvents. The gels formed range from optically transparent to slightly translucent, and complete fluidity can be restored by either increasing the temperature (reversible) or by chemical treatment (irreversible).

13 Claims, 10 Drawing Sheets

ORGANIC GELLATION AGENTS

BACKGROUND OF THE INVENTION

Gels are generally formed when attractions between molecules facilitate the formation of an extensive three-dimensional network that traps the solvent between "strands" of the network. For example, organic gel-foxing materials may have multiple polar functionalities that allow for network formation by hydrogen bonding.

Agents able to immobilize organic solvents as gels have many potential applications. For example, these materials could be used to gel marine oil and chemical spills and assist in their containment and recovery, particularly with a water insoluble gelling agent. Additionally, there may be applications in chemical synthesis because reactions occurring in a gelled solvent may proceed at different rates or with different regio- or stereo-selectivity as compared to similar reactions in traditional solvents. These materials might also be employed in the development of new chromatographic stationary phases or semi-permeable membranes, in the transfer of organic liquids, or in the application of solvents, like methylene chloride, in a gelled state (U.S. Pat. No. 4,986,936; U.S. Pat. No. 4,479,825). For example, it would be advantageous to gel organic liquids, such as fuels, industrial solvents and organic additives, prior to transportation, either for further use or disposal, in a gelled state. This gelled state would be more stable, less volatile, and easier and safer to contain in the event of an accident en route. One may even speculate as to the stabilization of organic liquids under near-zero gravity conditions of vehicles in earth orbit.

Alternatively, it would be beneficial to develop components for use in thixotropic materials. For example, compounds that gel organic liquids, such as acetone, toluene, benzene, ethyl acetate, alcohols, and methylene chloride, would be useful in varnish and paint remover to facilitate its storage, transportation and application. Wood stains are often benefitted by a gel formulation and could be prepared using the methods, compositions and compounds of the present invention. The formulation and/or stabilization of organic emulsions should also be aided by the new gel compositions of the present invention.

Unfortunately, compounds which cause gellation of organic solvents are unused and often complex and expensive to prepare. For example, Kobayashi describes the use of various compounds, including sorbitol derivatives, as gelling agents. (JP 05,320,617, JP 04,368,389, JP 04,352,787, and JP 03,281,684). JP 53,124,595 describes the gellation of an organic liquid by the incorporation of a gel of an alicyclic alcohol, which contains the alicyclic alcohol and the condensation product of an aromatic aldehyde and a polyhydric alcohol.

The present invention alleviates many of the problems inherent in the prior art by providing water insoluble organic gelling agents that are relatively simple and inexpensive to prepare.

SUMMARY OF THE INVENTION

The present invention encompasses a method for gelling an organic liquid comprising dissolving an effective amount of an aryl cyclohexanol gelling agent in an organic liquid, and cooling the resultant mixture to form a gel.

As used herein the term "dissolving" refers to causing the solid gelling agent to pass into solution such that the organic liquid and the gelling agent are in one liquid phase. It is envisioned that heating may be necessary to facilitate dissolution of the gelling agent.

As used herein the phrase "aryl cyclohexanol gelling agent" refers to a chemical composition of a 1-aryl cyclohexanol that facilitates the gellation of the organic liquid. Ineffective gelling agents appear to crystallize immediately rather than form gels. The cyclohexanol and aryl moieties may be further functionalized in aryl cyclohexanol gelling agents of the present invention.

In fact, some functionalization of the cyclohexanol is required because the stereochemistry at the hydroxyl carbon of the cyclohexanol is important. The 1-aryl group should be in the axial position. Therefore, it may be necessary for a sterically bulky alkyl group to be so situated on the cyclohexyl ring, to force the 1-aryl group into the axial position, i.e. by forcing the cyclohexanol ring to stay in one conformation. For example, preferred gelling agents of this invention employ tertiary alkyl groups in the 4 position trans to the alcohol functionality. Although there may be some electronic constraints on the types of alkyl groups that may be employed, it is envisioned that the primary factor in choosing the alkyl group will be employing a group that forces the cyclohexanol ring into the proper conformation. Thus, trans-1-aryl-4-tert-butylcyclohexanols are particularly preferred for practicing the present invention but other bulky alkyls may be found to perform as well. It is also envisioned that other structurally related alcohols with similarly positioned hydroxyl and aryl groups may also be useful in practicing the present invention.

The functionalization of the 1-aryl group is also important. For example, several closely related cyclohexanols were surprisingly ineffective gelling agents. For example, compounds with para-fluoro or pentafluoro substituted aryls were effective gelling agents while compounds with para-methoxy, para-methyl, para-trifluoromethyl and several other related substituted aryls were ineffective as gelling agents. While not limiting the present invention by any theory, it is postulated that this difference in gelling activity is due to a combination of steric and electronic substitutional effects. While several effective aryl groups (phenyl, para-fluorophenyl and pentafluorophenyl) have been prepared and tested, other phenyl substituents may be found by following the simple methods of the present invention involving dissolution of prospective gelling agents and cooling the solution to form a gel. Compounds that are ineffective at gelling tend to crystallize upon cooling.

More preferred gelling agents are trans-1-phenyl-4-tert-butylcyclohexanol (compound 2), trans-1-(para-fluorophenyl-4-tert-butylcyclohexanol (compound 3), and trans-1-(pentafluorophenyl)-4-tert-butylcyclohexanol (compound 4), with trans-1-phenyl-4-tert-butylcyclohexanol being the most preferred.

An "effective amount" of the gelling agent refers to the amount of gelling agent required to cause the gellation of the organic liquid. The exact amount required will depend on the nature of the organic liquid and the gelling agent as well as the temperature to which the mixture is cooled. A wide variety of concentrations are effective. An upper limit on the amount is the saturation point of a particular liquid, i.e. the solubility of the gelling agent in the hot organic liquid, because over-saturation may result in crystallization of the gelling agent out of the mixture upon cooling. Additionally, there is a tendency for concentrated solutions (>5%) to crystallize rapidly. It is envisioned that the most preferred gels will contain very small amounts of gelling agent, e.g., from about 0.2 to about 5% by weight.

A wide variety of organic liquids, including, but certainly not limited to, diethyl ether, toluene, heptane, methylene chloride, and ethyl acetate, can be gelled with the gelling agents of the present invention. While ethanol dissolved trans-1-Phenyl-4-tert-butylcyclohexanol (Compound 2), upon cooling trans-1-Phenyl-4-tert-butylcyclohexanol crystallized, rather than inducing gel formation. Many organic liquids, including organics not typically considered as solvents may by gelled by gelling agents of the present invention, e.g., such as alpha-pinene. The organic liquid should be capable of dissolving the aryl cyclohexanol gelling agent and gelling upon cooling, rather than resulting in crystals of gelling agent. The organic liquid can be a mixture of several organic chemicals and may also contain a mixture of dissolved chemicals. Generally, more polar liquids tend to require larger amounts of gelling agents and have lower "melting points".

The amount of cooling required for the formation of the gel depends on the nature and amount of the aryl cyclohexanol gelling agent and the composition of the organic liquid. Generally, the mixture should be cooled below the melting point of the gel. Additionally, lower temperatures tend to be required to gel more polar solvents and those mixtures with lower percentages of gelling agent.

A preferred embodiment of the present invention is where the aryl cyclohexanol gelling agent is from about 0.2 to about 5 percent by weight of the mixture. Concentrations of gelling agent above 5% by weight have not been generally operable due to problems with the gelling agent's solubility and its tendency to crystallize. As used herein, the term "mixture" is used to refer to the physical combination of the gelling agent and the organic liquid. This mixture can be homogeneous, heterogeneous or gelatinous.

Another embodiment of this invention encompasses the compositions of matter comprising trans-1-(para-fluorophenyl)-4-tert-butylcyclohexanol or trans-1-(pentafluorophenyl)-4-tert-butylcyclohexanol.

Another embodiment is a gel comprising an aryl cyclohexanol gelling agent and an organic liquid that is capable of dissolving the gelling agent. A preferred embodiment of the present invention employs a 1-aryl-4-alkylcyclohexanol as the gelling agent. More preferred gels use trans-1-phenyl-4-tert-butylcyclohexanol, trans-1-(para-fluorophenyl)-4-tert-butylcyclohexanol, and trans-1-(pentafluorophenyl)-4-tert-butylcyclohexanol as the gelling agent, with trans-1-phenyl-4-tert-butylcyclohexanol being the most preferred.

More preferred gels of this invention contain from about 0.2 to about 5 percent cyclohexanol gelling agent by weight of the mixture and employ diethyl ether, toluene, heptane, methylene chloride, or ethyl acetate as the organic liquid.

Another embodiment of the present invention encompasses a method for gelling a first organic liquid incapable of dissolving an aryl cyclohexanol gelling agent but miscible with a second organic liquid that can dissolve said agent. This method comprises dissolving an effective amount of an aryl cyclohexanol gelling agent in the second organic liquid, mixing this solution with a first organic liquid, and cooling the resultant mixture to form a gel. This method is envisioned as being useful in the prevention, clean-up, containment, transfer, and recovery of chemical and oil spills.

As used herein the term "first organic liquid" refers to any organic liquid incapable of substantially dissolving the cyclohexanol gelling agent, for example, mineral oil. The phrase "second organic liquid" refers to liquids that dissolve the gelling agent and gel upon cooling, such as the organic solvents mentioned above.

A preferred embodiment employs 1-aryl-4-alkyl-cyclohexanols as the gelling agent, with trans-1-phenyl-4-tert-butylcyclohexanol, trans-1-(para-fluorophenyl-4-tert-butylcyclohexanol, and trans-1-(pentafluorophenyl)-4-tert-butylcyclohexanol being more preferred and trans-1-phenyl-4-tert-butylcyclohexanol being the most preferred.

A preferred embodiment of this invention encompasses the method for gelling a chemical substance wherein the gelling agent is from about 0.2 to about 5 percent by weight of the mixture and the first organic liquid is diethyl ether, toluene, heptane, methylene chloride, or ethyl acetate.

The present invention may be used as a method of impeding undesired evaporation of an organic solvent that dissolve aryl cyclohexanols by employing aryl cyclohexanol gelling agents. The method involves selecting a particular sample of such an organic solvent possibly subject to conditions allowing undesired evaporation, dissolving an effective amount of an aryl cyclohexanol gelling agent in said sample to form a solution, and cooling the solution to form a gel. Evaporation of the solvent from the gel is thereby impeded.

The present invention also includes a method of impeding leakage of a solvent that dissolves aryl cyclohexanols from a container by employing an aryl cyclohexanol gelling agent. This comprises selecting a sample of a solvent held or to be held in a container, dissolving an effective concentration of an aryl cyclohexanol gelling agent in the solvent to form a solution and cooling the solution after enclosure in a container to form a gel. Leakage of the solvent from any pores or openings in the container is thus impeded.

DETAILED DESCRIPTION OF THE PREFERRED EMBODIMENTS

Figure 1:
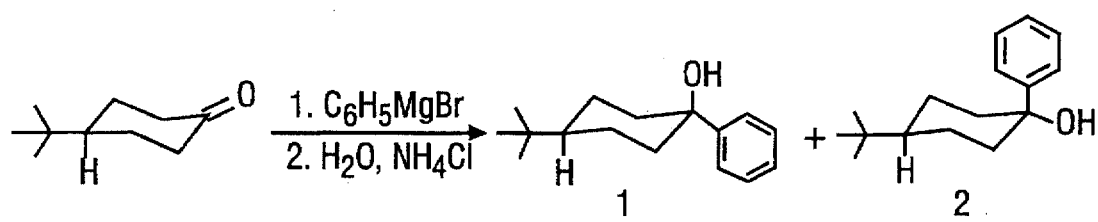
FIG. 1. Synthesis of Gelling Agent trans-1-Phenyl-4-tert-butylcyclohexanol (Compound 2).

The organic gelling agents of the present invention offer many advantages over those previously reported because of their different structural, physical and chemical properties. The alcohols such as trans-1-phenyl-4-tert-butylcyclohexanol (compound 2) are considerably smaller than known gelling agents (see FIG. 1). Thus, the new materials- aryl cyclohexanol gelling agents- have higher volatility and can be made to evaporate or sublime under the proper conditions, i.e. vacuum and heating. The smaller size may provide different gellation kinetics (rate of gel formation). The new materials are also almost certainly less water soluble than the known gelling agents which may make them more suitable for use in water-containing environments.

In practicing the present invention, the 1-aryl group of the cyclohexanol gelling agent should be in the axial position. For example, compound 2 is an active gelling agent while compound 1 is not (see FIG. 1). The preferred gelling agents of this invention employ tertiary alkyl groups in the 4 position trans to the alcohol functionality. Thus, trans-1-aryl-4-tert-butylcyclohexanols are particularly preferred for practicing the present invention but other bulky alkyls may be found to perform as well.

In addition, tertiary benzylic alcohols such as compound 2 undergo dehydration rapidly in the presence of suitable acids. This could provide a method of quickly and irreversibly de-gelling these materials. It is unlikely that the previously known materials could accommodate such an irreversible process. Gels made with various solvents and compound 2 were subjected to conditions of low pressure. Solvent evaporation was very slow from the gel as compared to the ungelled solvent. This can reduce undesired solvent loss in an economically and environmentally sound manner. The flow of solvents from a gel, or the flow of the gel, in a container with pores or openings is also substantially slower than the flow of ungelled solvent from such a container.

EXAMPLE 1

During the preparation and the isolation of alcohols 1 and 2 by addition of a phenyl Grignard reagent to 4-tert-butylcyclohexanone, the formation of a gel was observed. (See FIG. 1). Following separation of the two isomers, the gellation behavior was traced entirely to alcohol 2.

The gels are generally prepared by dissolving alcohol 2 (a solid) into a given solvent using heat; upon cooling, a slightly translucent gel is observed. The gels will re-liquify if warmed sufficiently, with the process being entirely reversible. Alcohol 2 crystallizes very slowly from a gel if the process is initiated with a small amount of solid. The preparation of alcohols 1 and 2 by the same or similar routes has been reported many times, though no reference to gellation behavior has been reported.

Figure 2:
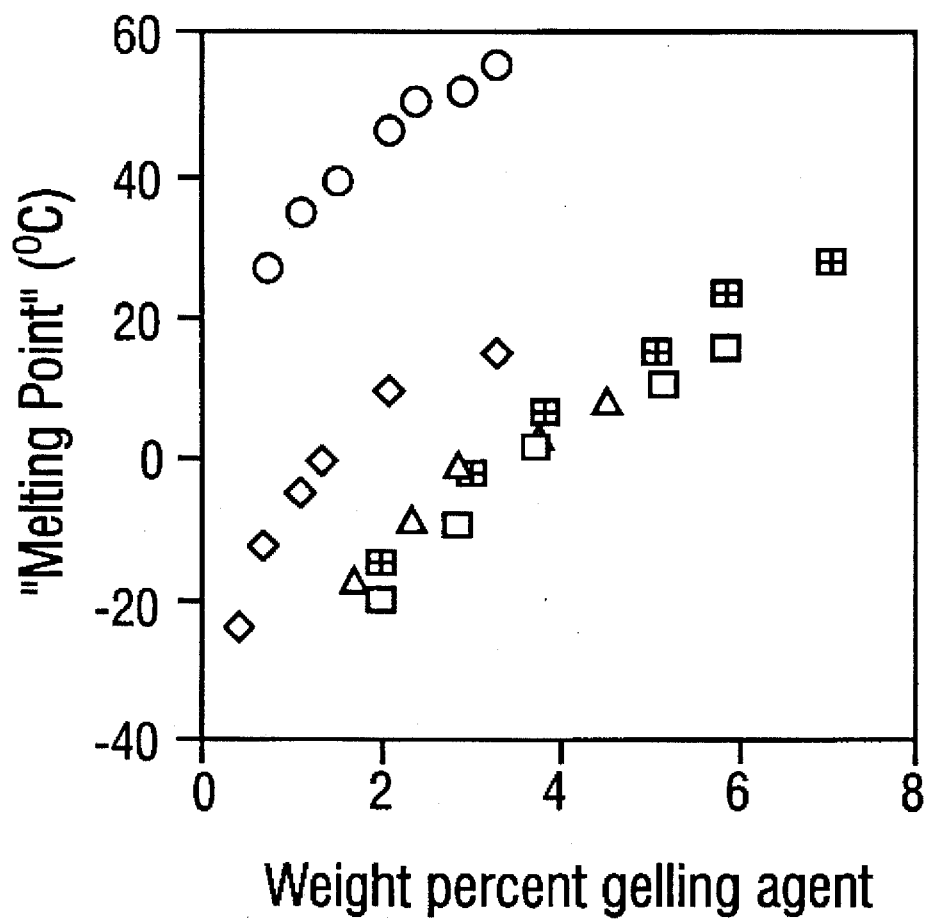
FIG. 2. Correlation of melting point with weight percent of the gelling agent trans-1-phenyl-4-tert-butylcyclohexanol (Compound 2) in □ diethyl ether, ◇ toluene, ○ heptane, △ dichloromethane, and ⊞ ethyl acetate.

Alcohol 2 causes gellation in a variety of organic solvents such as, e.g., heptane, ethyl acetate, toluene, dichloromethane and ether, though different concentrations were required in each solvent to achieve gellation at a given temperature. FIG. 2 illustrates the general trend observed, that more polar solvents require higher amounts of the agent in order to gel. The agent was dissolved in the solvent at various weight percents and the solution cooled to a gel. The melting points were then observed upon slow warming.

EXAMPLE 2

Figure 3:
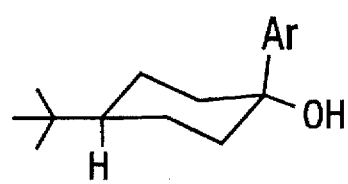
FIG. 3. Modifications of the aromatic ring of compound 2 studied. Of the modified components, only the two ring fluorinated compounds 3 and 4 (in box) were active gelling agents.
Figure 3:
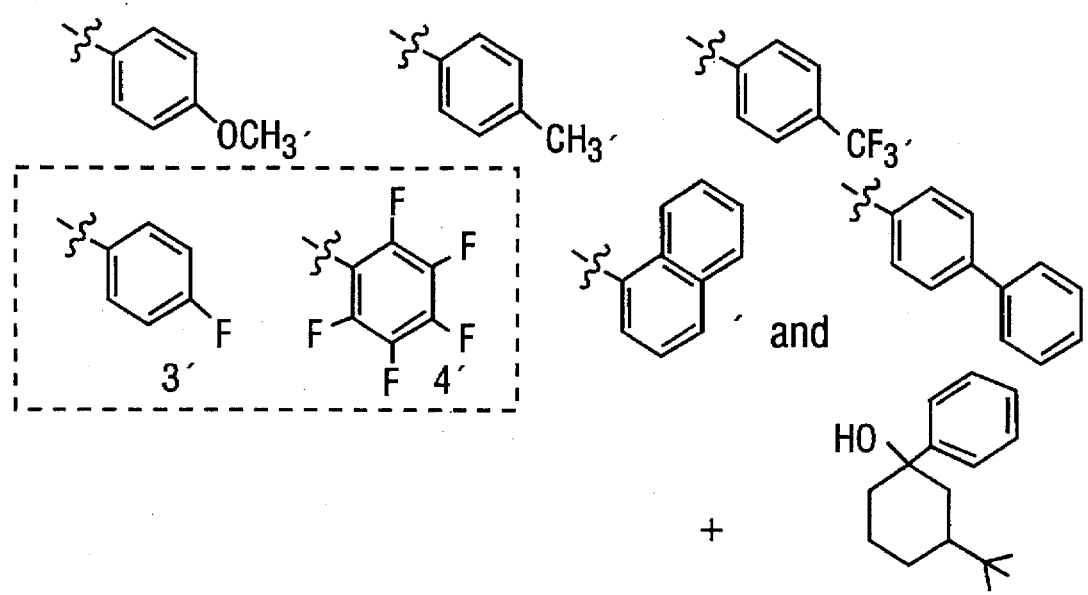
Figure 4:
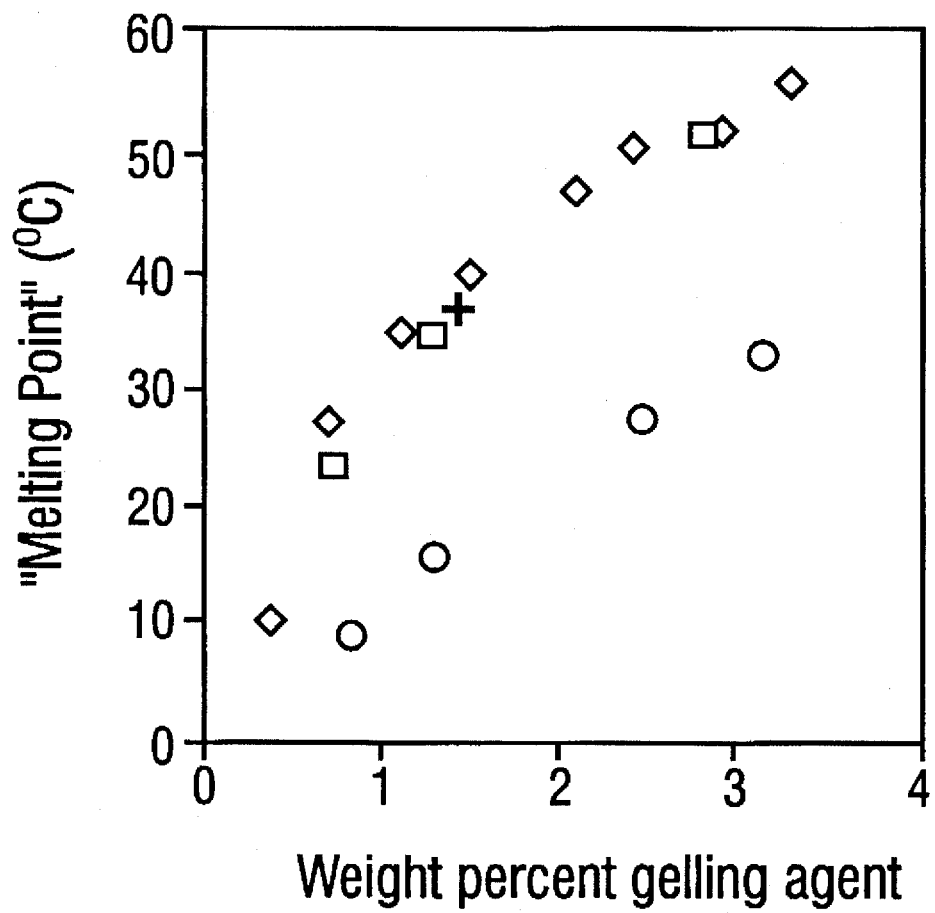
FIG. 4. Comparison of Compounds 2 (◇), 3 (□) and 4 (○) for ability to gel heptane. Unresolved compound 2 (+) was 51% trans and 49% cis, and the weight percent was based on the amount of the trans isomer present.
Figure 5:
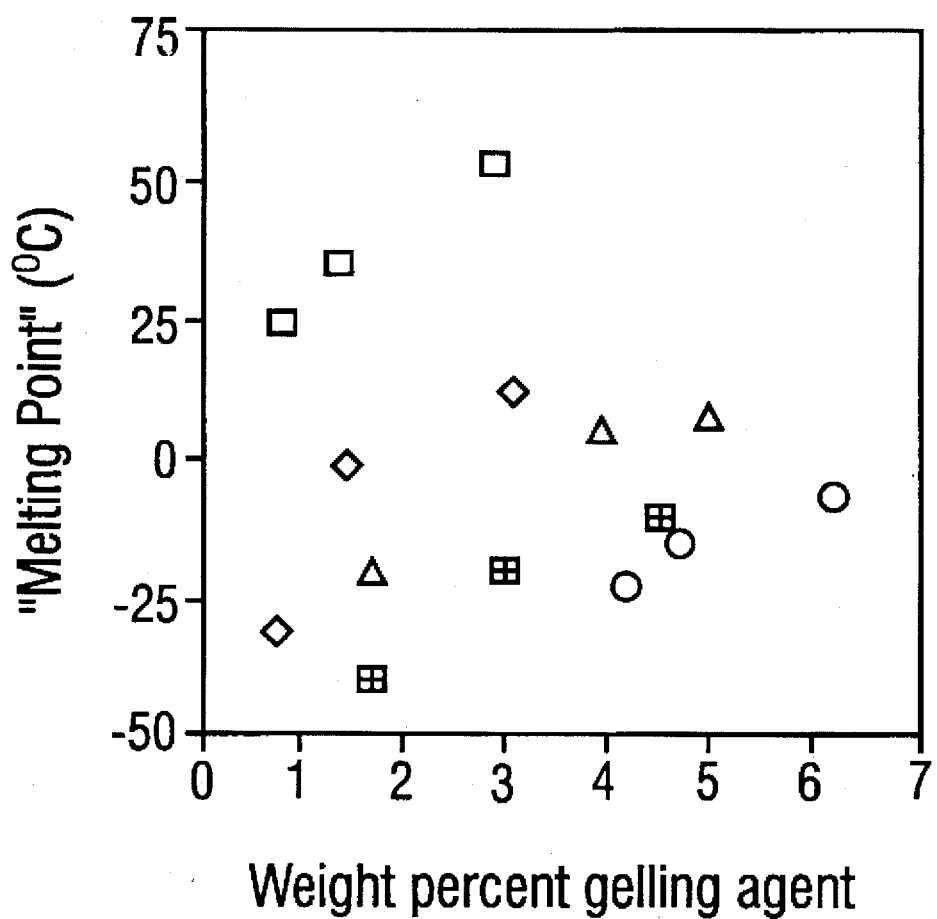
FIG. 5. Gel melting point versus weight percent of para-fluoro gelling agent, compound 3, in heptane (□), toluene (◇), diethyl ether (○), dichloromethane (△), and ethyl acetate ⊞.
Figure 6:
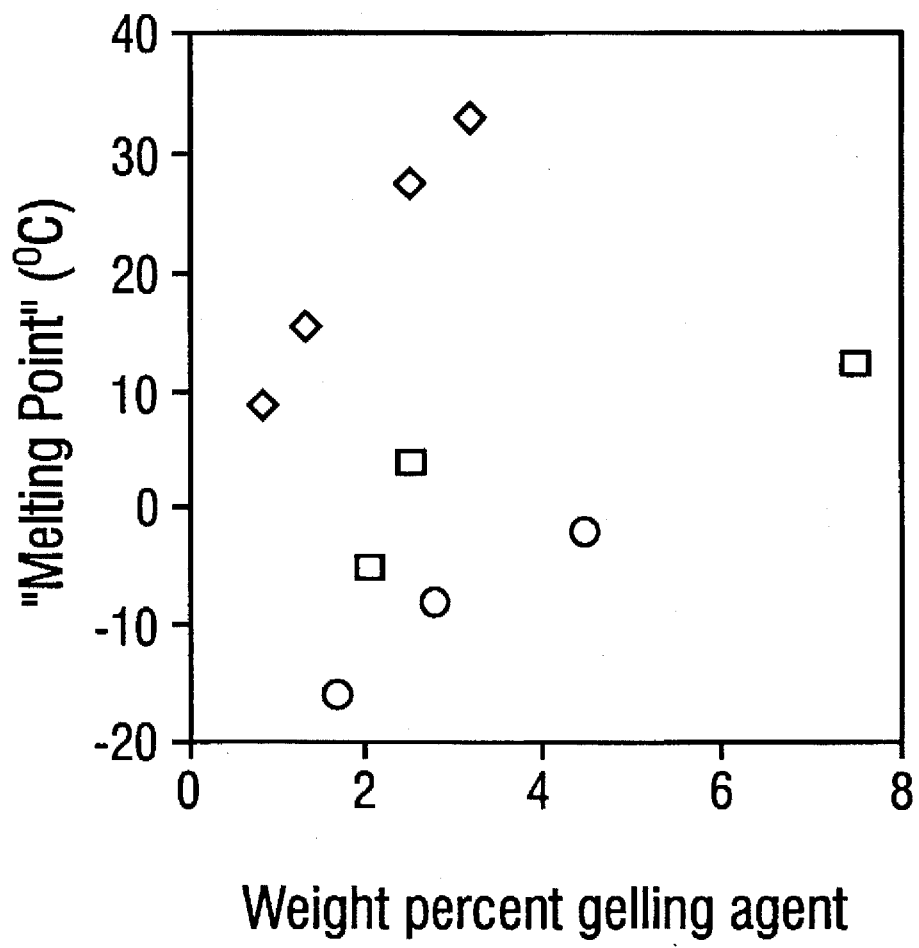
FIG. 6. Gel melting point versus weight percent of pentafluoro gelling agent, compound 4, in toluene (□), heptane (◇), and methylene chloride (○).

The gellation activity of a variety of structurally related molecules was investigated. Compounds containing a total of seven different aromatic rings were prepared and screened for gellation behavior. (See FIG. 3). Only certain ring-fluorinated aromatics (compound 3 and 4) exhibited gellation activity, again with only one of the two isomers being active. Compounds 2 and 3 are exhibit relatively comparable gelling activity in heptane and were more effective gelling agents than compound 4 in heptane (see FIG. 4). Gelling activity is also effected by weight percent of agent and the nature of the solvent (see FIG. 5 and FIG. 6). For example, the higher the weight percent, the higher the melting temperature. In addition, the formation of gels with higher melting temperatures is seen with more apolar organic liquids. The sensitivity to organic liquid is exhibited by employing toluene as the organic liquid because in toluene all compounds 2, 3 and 4 exhibit different gelling activities, as opposed to heptane where compounds 2 and 3 exhibit comparable gelling activity. In all cases, optically transparent gels were observed. In addition, compound 3 exhibits extreme resistance to crystallization.

EXAMPLE 3

When unresolved compound 2, i.e., 51% trans and 49% cis was utilized, it was noted that, when calculated according to how much of the trans isomer was present, the gelling capacity was almost identical to that of the resolved trans isomer. This was indicated in FIG. 4 (see "+" in FIG. 4.). This indicates that although the cis isomer was not an effective gelling agent, it did not inhibit gellation by the trans isomer.

EXAMPLE 4

The Gel Melting Point Behavior Employing Compounds 2, 3 and 4

Figure 7:
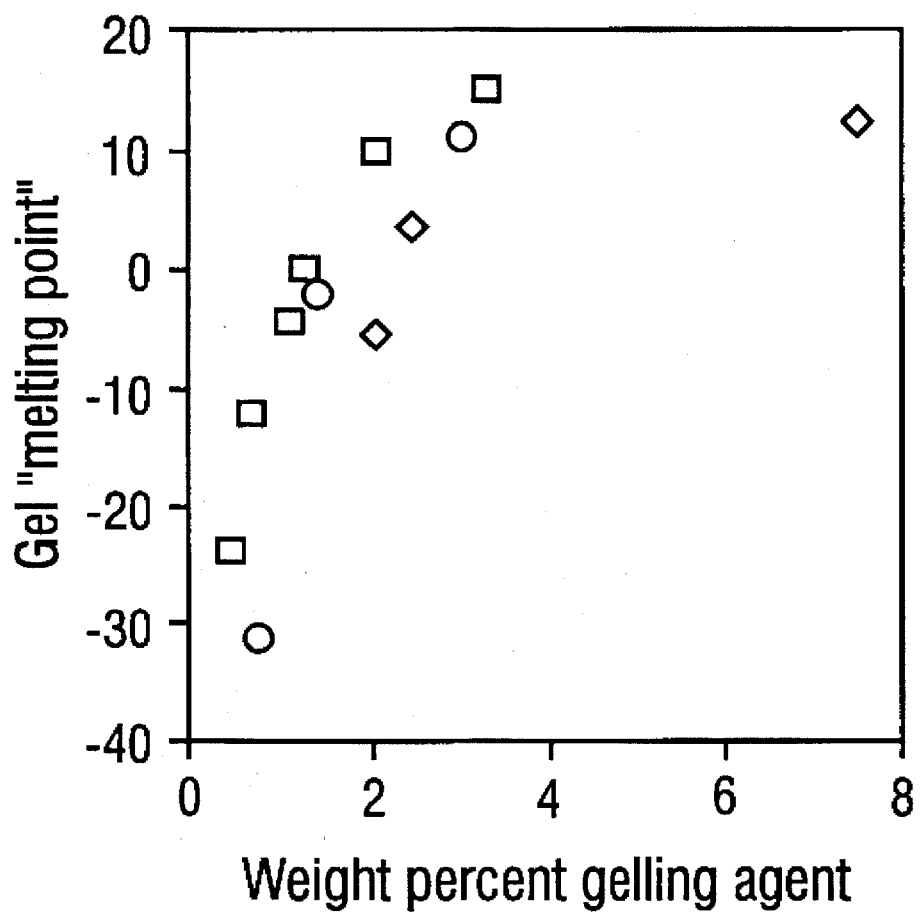
FIG. 7. Gel melting point versus weight percent of gelling agent compound 2 (□), compound 3 (◇), and compound 4 (○) in toluene.
Figure 8:
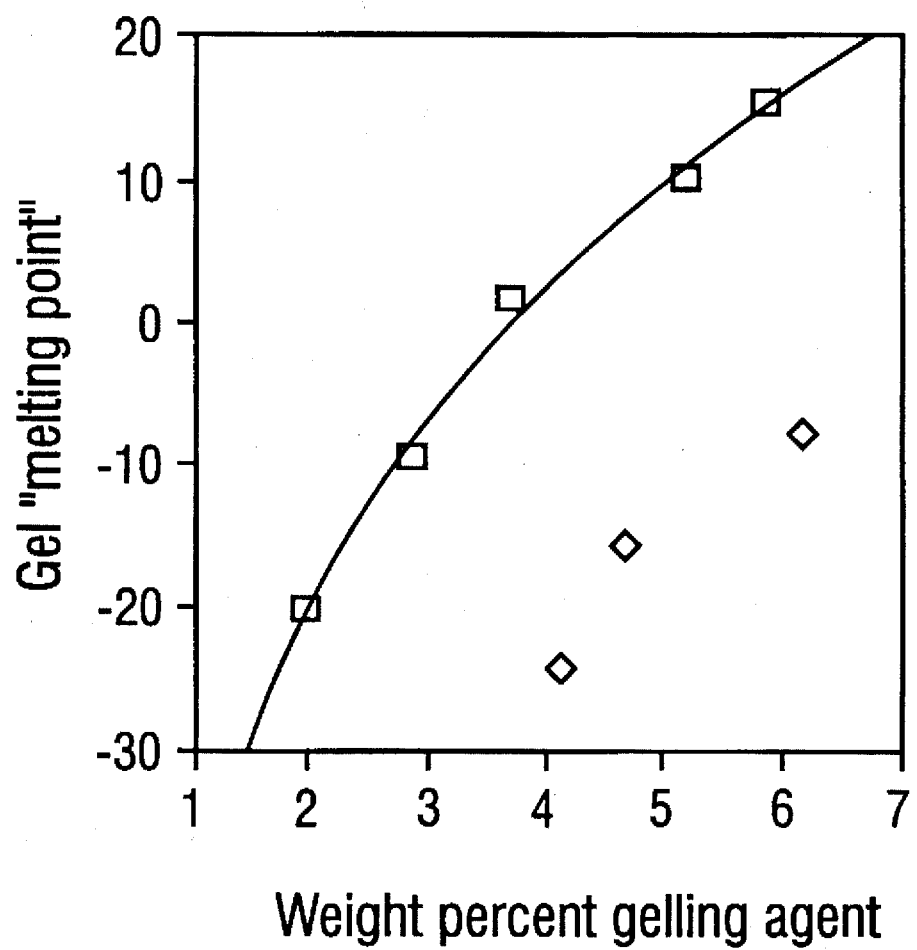
FIG. 8. Gel melting point versus weight percent gelling agent compound 2 (□) and compound 3 (◇) in diethyl ether.
Figure 9:
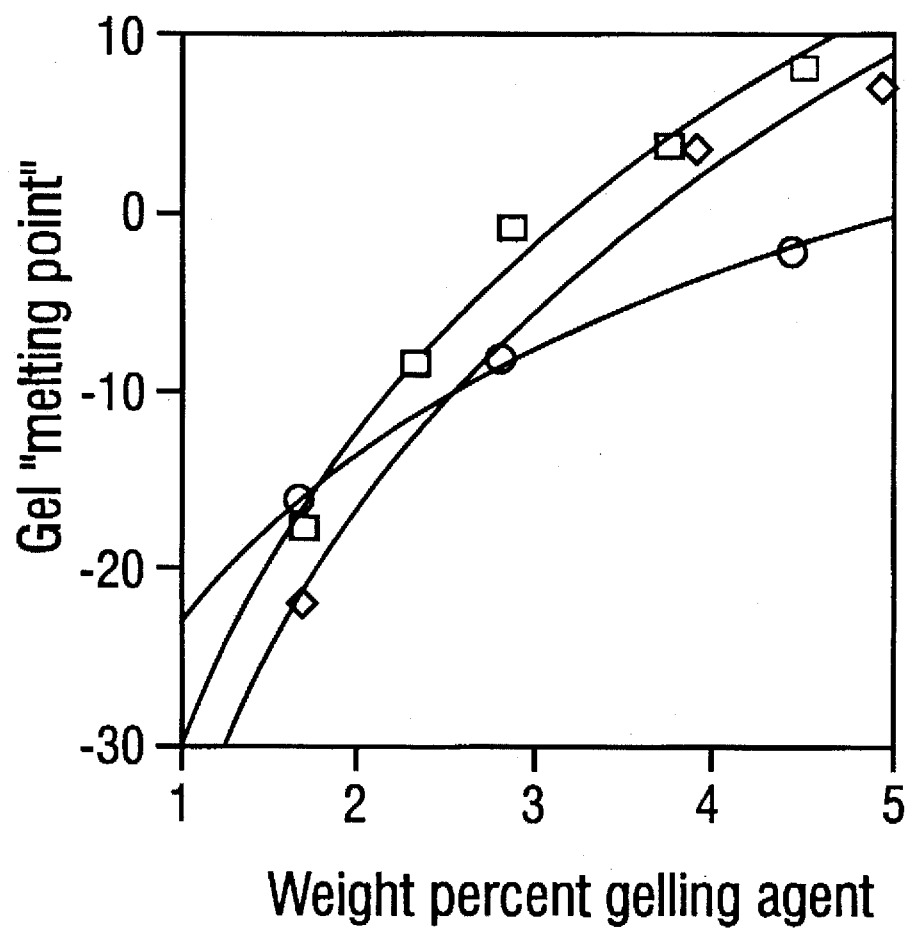
FIG. 9. Gel melting point versus weight percent of gelling agent compound 2 (□), compound 3 (◇), and compound 4 (○) in dichloromethane.
Figure 10:
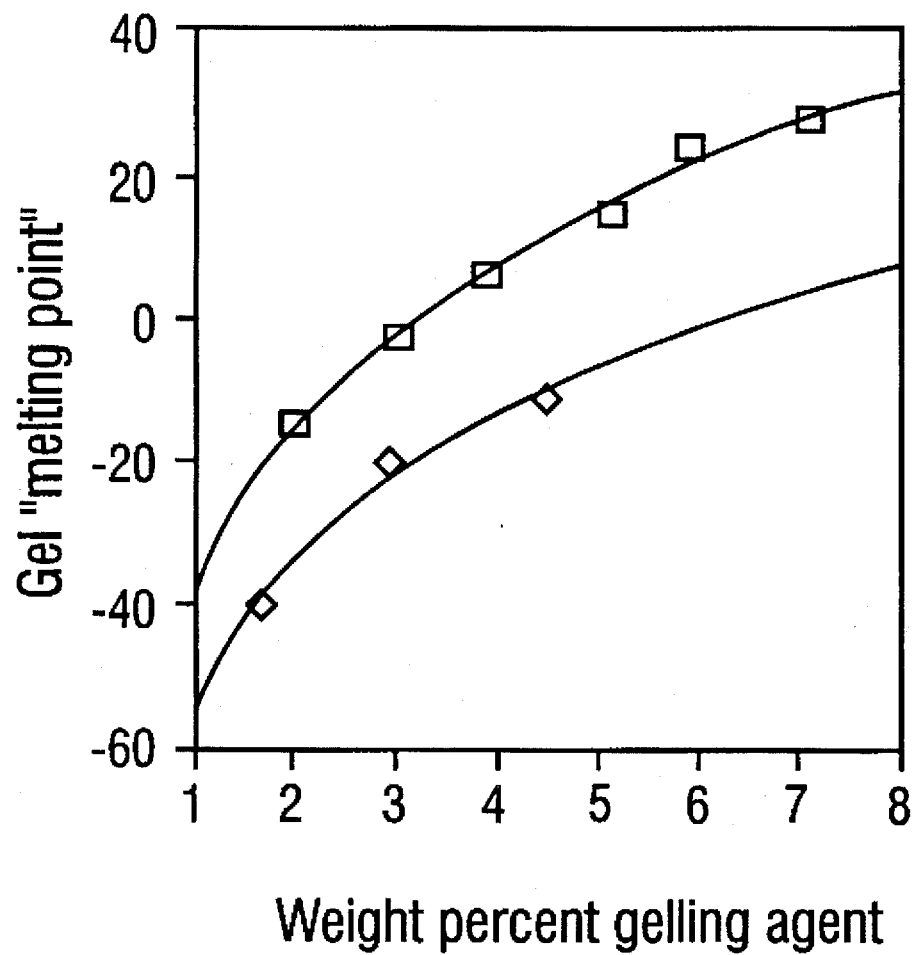
FIG. 10. Gel melting point versus weight percent gelling agent compound 2 (□) and compound 3 (◇) in ethyl acetate.

FIG. 7 shows the melting point versus weight percent of the gelling agent for various gels formed from toluene and compounds 2, 3 or 4. FIG. 8 shows the gel melting point versus weight percent of the gelling agent for compounds 2 and 3 in diethyl ether. FIG. 9 shows the gel melting point versus weight percent of the gelling agent for compounds 2, 3 and 4 in dichloromethane. FIG. 10 shows the gel melting point versus weight percent of gelling agent for compound 2 and compound 3 in ethyl acetate.

EXAMPLE 5

These gelling agents may also gels liquids in which they do not dissolve. This has potential application in the clean-up, containment and storage of chemical spills, particularly those containing oils, for example. For example, compound 2 was dissolved in diethyl ether. This solution was then added to mineral oil and cooled to form a gel, even though compound 2 is not soluble in mineral oil.

While the compositions and methods of this invention have been described in terms of preferred embodiments, it will be apparent to those of skill in the art that variations may be applied to the systems, compositions, methods and in the steps or in the sequence of steps of the methods described herein without departing from the concept, spirit and scope of the invention. For example, it will be apparent that certain agents which are chemically, compositionally and functionally related may be substituted for the agents described herein where the same or similar results may be achieved. All such similar substitutes and modifications apparent to those skilled in the art are considered to be within the spirit, scope and concept of the invention as defined by the appended claims.

The following references are incorporated in pertinent pan by reference herein for the reasons cited in the above text.

BIBLIOGRAPHY

U.S. Pat. No. 4,986,936.
U.S. Pat. No. 4,479,825.

JP 53,124,595.
JP 05,320,617.
JP 04,368,389.
JP 04,352,787.
JP 03,281,684).

What is claimed is:

1. A method for gelling an organic liquid comprising:
   dissolving an effective amount of trans-1-phenyl-4-tert-butylcyclohexanol, trans-1-(para-fluorophenyl)-4-tert-butylcyclohexanol, or trans-1-(pentafluorophenyl)-4-tert-butylcyclohexanol in an organic liquid and cooling resultant mixture to form a gel.

2. The method of claim 1, wherein the concentration of the dissolved 1-aryl-4-tert butylcyclohexanol is from about 0.2 to about 5 percent by weight of the mixture.

3. The method of claim 1, wherein the organic liquid is diethyl ether, toluene, heptane, methylene chloride, or ethyl acetate.

4. A method for gelling an organic liquid comprising:
   dissolving an effective amount of trans-1-phenyl-4-tert-butylcyclohexanol in an organic liquid; and
   cooling the resultant mixture to form a gel.

5. A gel comprising a trans-1-phenyl-4-tert-butylcyclohexanol, trans-1-(para-fluorophenyl)-4-tert-butylcyclohexanol, or trans-1-(pentafluorophenyl)-4-tert-butylcyclohexanol agent and an organic liquid capable of dissolving said agent.

6. The gel of claim 5, wherein the concentration of the 1-aryl-4-tert-butylcyclohexanol agent is from about 0.2 to about 5 percent by weight of the gel.

7. The gel of claim 5, wherein the organic liquid is diethyl ether, toluene, heptane, methylene chloride, or ethyl acetate.

8. A gel comprising a trans-1-phenyl-4-tert-butylcyclohexanol agent and an organic liquid capable of dissolving said agent.

9. A method of gelling a first organic liquid incapable of dissolving an aryl cyclohexanol gelling agent but miscible with a second organic liquid capable of dissolving said agent, the method comprising:
   dissolving an effective amount of trans-1-phenyl-4-tert-butylcyclohexanol, trans-1-(para-fluorophenyl)-4-tert-butylcyclohexanol, or trans-1-(pentafluorophenyl)-4-tert-butylcyclohexanol gelling agent in a second organic liquid;
   mixing this solution with a first organic liquid; and
   cooling the resultant mixture to form a gel.

10. The method of claim 9, wherein the concentration of the 1-aryl-4-tert-butylcyclo-hexanol gelling agent is from about 0.2 to about 5 percent by weight of the mixture.

11. The method of claim 9, wherein the second organic liquid is diethyl ether, toluene, heptane, methylene chloride, or ethyl acetate.

12. The method of claim 9, wherein the first organic liquid is mineral oil.

13. A method of gelling a first organic liquid incapable of dissolving an aryl cyclohexanol gelling agent but miscible with a second organic liquid capable of dissolving said agent, the method comprising:
   dissolving an effective amount of trans-1-phenyl-4-tert-butylcyclohexanol gelling agent in a second organic liquid;
   mixing this solution with a first organic liquid; and
   cooling the resultant mixture to form a gel.

* * * * *